Patented Jan. 20, 1942

2,270,839

UNITED STATES PATENT OFFICE 2,270,839

PURIFICATION OF PENTAERYTHRITOL

Joseph A. Wyler, Allentown, Pa., assignor to Trojan Powder Company, Allentown, Pa.

No Drawing. Application September 4, 1940, Serial No. 355,356

4 Claims. (Cl. 260—637)

This invention relates to the purification of pentaerythritol.

Commercial pentaerythritol varies considerably from the standpoint of purity. One grade has a melting point of greater than 250° C.; another melts at about 233-240° C.; another at about 195-215° C.; and another at 185-190° C. Pure pentaerythritol melts at 260.5° C. and pure dipentaerythritol at 221° C. Simple mixtures of pentaerythritol and dipentaerythritol melt at temperatures between 190 and 260.5° C. Also, pentaerythritol and dipentaerythritol form at least two double compounds, which in turn have their own individual melting points. One double compound has the composition

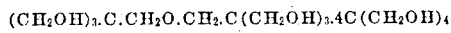

and melts at about 185°+ C. This is disclosed in Serial No. 326,380 by Wyler and Wernett. Consequently, commercial pentaerythritol is not simply a mixture of pentaerythritol and dipentaerythritol, but consists of pentaerythritol, dipentaerythritol, and one or more double compounds of pentaerythritol and dipentaerythritol.

I have discovered that a high quality pentaerythritol may be made from any of these lower grades by treating the latter with aliphatic alcohols under certain special conditions.

It is a well known expedient in this art to improve the quality of pentaerythritol by washing with ethyl or methyl alcohol in the cold or at temperatures somewhat below the boiling point of the methyl or ethyl alcohol used. This procedure causes only a slight improvement and is totally ineffective when working with the double compound mentioned above. It is based solely upon the principle of selective solubility. This washing is not my invention.

My invention is based upon my discovery that, if the impure pentaerythritol is stirred in contact with an aliphatic alcohol at temperatures above 80° C., and particularly above 108° C., that a high quality pentaerythritol (melting point greater than 250° C.) is produced even when starting out with a pentaerythritol of melting point as low as 185-190° C. This new and useful result is obtained because the alcohols, at the high temperatures, cause a splitting up of the double compounds of pentaerythritol and dipentaerythritol into pentaerythritol and dipentaerythritol while at the same time holding dipentaerythritol and a relatively small proportion of the pentaerythritol in solution. The insoluble pentaerythritol is filtered off, washed with an alcohol or with water, and finally dried. This product will have a high melting point. In this connection it should be borne in mind that after the double compounds have once been split apart by means of the alcohol and heat, the alcohol mixture may then be cooled to below 80° C. or even 30° C. and still yield a high grade pentaerythritol. The double compounds do not reform in alcoholic media containing less than about 7% of water.

Among the alcohols which I may use are the monohydrics as methyl, ethyl, normal propyl, isopropyl, the butyls, amyls and hexyls, the dihydrics as the glycols, and the trihydrics as the glycerines. Also, I may use these alcohols under pressure (particularly the methyl, ethyl and propyl) for the purpose of raising the temperature of the mixture of pentaerythritols and the alcohol to above about 108° C.

In order more clearly to point out my invention the following examples, in which all parts are by weight, are given.

Example #1

100 parts of a low melting point pentaerythritol which was essentially the double compound,

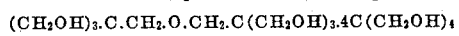

were heated at 135° C. in 200 parts of glycerine for about one hour, with stirring. The hot mixture was allowed to cool to about 100° C., when it was filtered. The crystals were washed with water and finally with alcohol and dried. The crystals which were obtained in good yields had a melting point of 244-250° C. whereas the original pentaerythritol melted at 185-190° C.

Example #2

A mixture of 100 parts of a low melting point (185-190° C.) pentaerythritol which was essentially the double compound

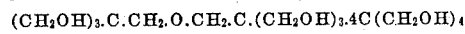

and 150 parts of normal amyl alcohol was refluxed at 127° C. on an oil bath for one hour. The mixture was filtered as rapidly as possible so as to avoid an undue drop in temperature and the crystals were washed with alcohol and dried in an oven. These crystals, which were obtained in good yield, had a melting point of 247.5-248.9° C. The hot filtrate, upon cooling to 50° C., yielded a small amount of material melting at 210-223° C. and upon further cooling gave a further small crop of crystals melting at 193-215° C.

Example #3

Using a mixture of 50 parts of a pentaerythritol of about 242° C. melting point and 100 parts of commercial iso-propanol, heating to 81-82° C.

(boiling point) and operating in the same manner as in the preceding examples a yield of 40 grams of a pentaerythritol of melting point 250–252.5° C. was obtained.

*Example #4*

Using a mixture of 50 parts of pentaerythritol of melting point 250° C. and 100 parts of amyl alcohol in the same manner as above, a product of 252.6–253.5° C. melting point was obtained.

As indicated above, the alcohols when used in accordance with my procedure cause the double compound

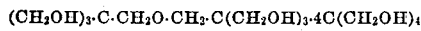

and any others which may be present to split up with the formation of pentaerythritol and dipentaerythritol. The greater portion of the pentaerythritol separates as very fine octahedrons and most of the dipentaerythritol together with some pentaerythritol goes into solution in the alcohols. This change can be observed megascopically. The coarse or elongated crystals of impure pentaerythritol are converted to the fine octahedrons which are pure pentaerythritol. It is also observable that this physical change takes place rather abruptly at about 108° C. regardless of which alcohol is used, that no such change takes place below about 75–80° C., and that some change is observable at about 80° C. These two temperatures, about 80° C. and about 108° C., are critical temperatures. One double compound splits up at about 80° C. and another

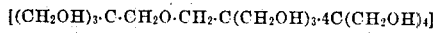

at about 108° C.

In all experiments made, the alcohols used were the usual commercial grades. The methyl and ethyl alcohols contained about 7% of water, the glycerols, and glycols about 5% and the other alcohols somewhat less. Consequently, the term "alcohol" as used in this specification includes alcohols containing minor amounts of water.

In co-pending applications Serial No. 326,380 and Serial No. 340,090 is disclosed a process for the preparation of high melting point pentaerythritol through the use of water instead of these alcohols.

I claim:

1. The process for the preparation of high-melting-point pentaerythritol which comprises heating an impure pentaerythritol in contact with a liquid aliphatic alcohol at a temperature above 80° C. to effect a splitting up of double compounds of pentaerythritol and dipentaerythritol, and separating the crystals which form.

2. The process for the preparation of high-melting-point pentaerythritol which comprises heating the impure pentaerythritol in contact with a liquid aliphatic alcohol at a temperature of about 108° C., and separating the crystals which form.

3. The process for the preparation of high-melting-point pentaerythritol which comprises heating the impure pentaerythritol in contact with a liquid aliphatic alcohol at a temperature above 80° C., filtering off the crystals, washing with alcohol and drying.

4. The process for the preparation of high-melting-point pentaerythritol which comprises contacting about 100 parts by weight of low-melting-point pentaerythritol with about 150 parts by weight of boiling commercial amyl alcohol for one hour or more, with stirring; filtering while hot, washing the filter cake with alcohol and drying.

JOSEPH A. WYLER.